United States Patent [19]

Kondo

[11] Patent Number: 4,600,129
[45] Date of Patent: Jul. 15, 1986

[54] CHEMICALS SPREADER

[75] Inventor: Keiji Kondo, Higashiyamato, Japan

[73] Assignee: Komatsu Zenoah & Co., Japan

[21] Appl. No.: 575,196

[22] Filed: Jan. 30, 1984

[51] Int. Cl.[4] .............................................. B67D 5/64
[52] U.S. Cl. .................................... 222/175; 239/153; 406/38
[58] Field of Search ................... 222/175; 406/38, 139, 406/140; 224/907, 210, 261; 221/185; 239/654, 128, 153, 152, 345

[56] References Cited

U.S. PATENT DOCUMENTS

| | | | |
|---|---|---|---|
| 2,958,155 | 11/1960 | Emmerich | 222/175 X |
| 3,199,785 | 8/1965 | Schmierer | 239/153 |
| 3,223,286 | 12/1965 | Sawyer | 222/175 |
| 3,567,120 | 3/1971 | Suda | 239/152 X |
| 3,586,238 | 6/1971 | Schmierer et al. | 239/153 |

FOREIGN PATENT DOCUMENTS

| | | | |
|---|---|---|---|
| 208737 | 8/1956 | Australia | 239/654 |
| 145549 | 12/1935 | Fed. Rep. of Germany | 224/210 |
| 2649067 | 5/1978 | Fed. Rep. of Germany | 224/210 |
| 1139998 | 1/1969 | United Kingdom | 239/152 |

Primary Examiner—Joseph J. Rolla
Assistant Examiner—David H. Bollinger
Attorney, Agent, or Firm—Wigman & Cohen

[57] ABSTRACT

A chemicals spreader to be carried on the back of an operator has a pack board which has a plurality of grooves provided on the front side thereof for exhausting air. The air is supplied by a fan which is to make a mixture of air and chemicals. The chemicals spreader also has a horizontal frame having a plurality of holes for exhausting air toward the back of the operator.

5 Claims, 7 Drawing Figures

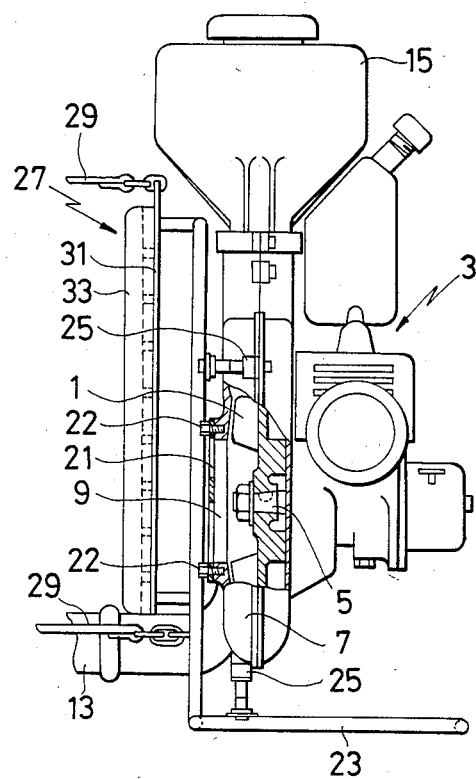
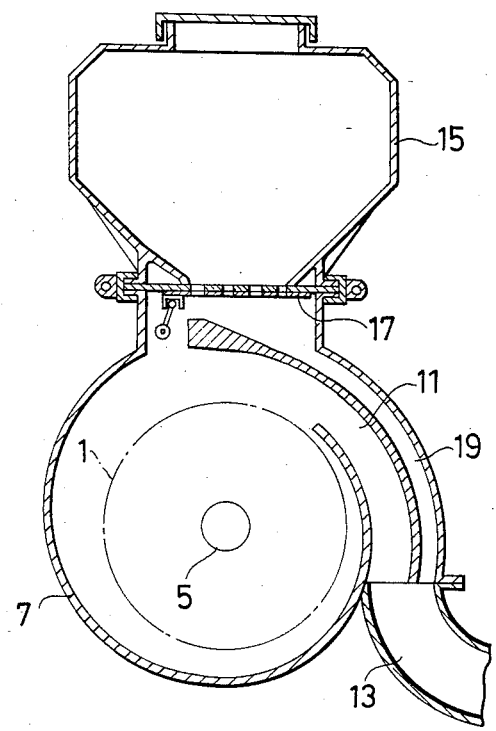
FIG. 1
FIG. 2

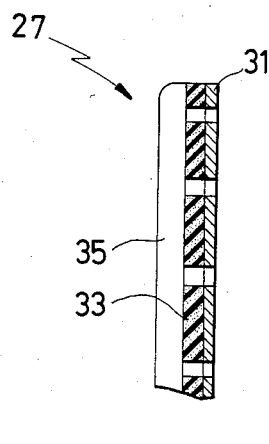
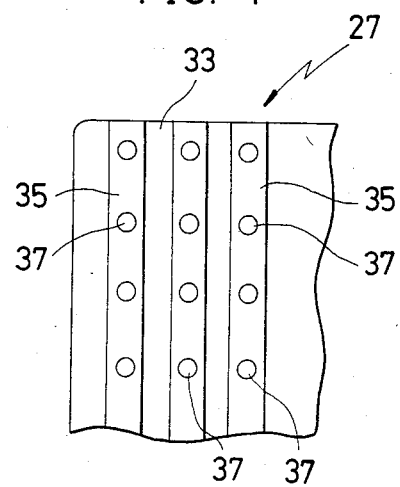
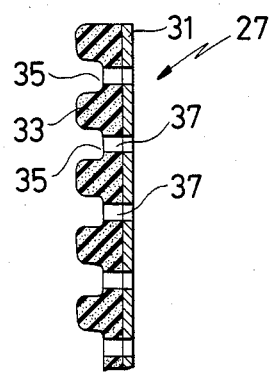

CHEMICALS SPREADER

BACKGROUND OF THE INVENTION

The present invention relates to a chemicals spreader for spreading a mixture of liquid or powder chemicals and air which is produced by introducing the liquid or powder chemicals from a chemicals reservoir into an air stream caused by a fan.

When using a conventional chemicals spreader, an operater carries the spreader with the front side of the pack board of the spreader abutted on his back and with pack belts hung on his shoulders so as to spread chemicals. Since the pack board is tightly supported under load on the back of the operator, when operated in hot summer, sweat would hardly evaporate from his back because of little air flow over the portion of his back mating with the pack board, which would make the operater feel unpleasant and the operation inefficient.

SUMMARY OF THE INVENTION

Accordingly, the primary object of the present invention is to provide a chemicals spreader having a fan by which an air stream flows over the back of the operator so as to accelerate evaporation of sweat from the back of the operator and cool the back of the operator thereby reducing the unpleasant feeling in the back of the operator during operation and increasing the efficiency of operation.

Another object of the present invention is to provide a chemicals spreader having a means to provide air flow over the back of the operator during operation of the chemicals spreader.

According to one embodiment of the present invention, a means is provided for exhausting part of the air stream from a fan of the chemicals spreader onto the back of the operator of the chemicals spreader, specifically into spaces between the back of the operator and the pack board of the spreader, thereby cooling the back of the operator.

BRIEF DESCRIPTION OF THE DRAWING

FIG. 1 is a side elevational view of one embodiment of the present invention

FIG. 2 is a side sectional view of the major portion of one embodiment of the present invention.

FIG. 3 is a cross sectional view of the pack board of the embodiment of FIG. 1.

FIG. 4 is a partial front elevational of the pack board of the embodiment of FIG. 1.

FIG. 5 is a horizontal sectional view of the pack board of the embodiment of FIG. 1.

DETAILED DESCRIPTION OF EMBODIMENTS

Figure 6:
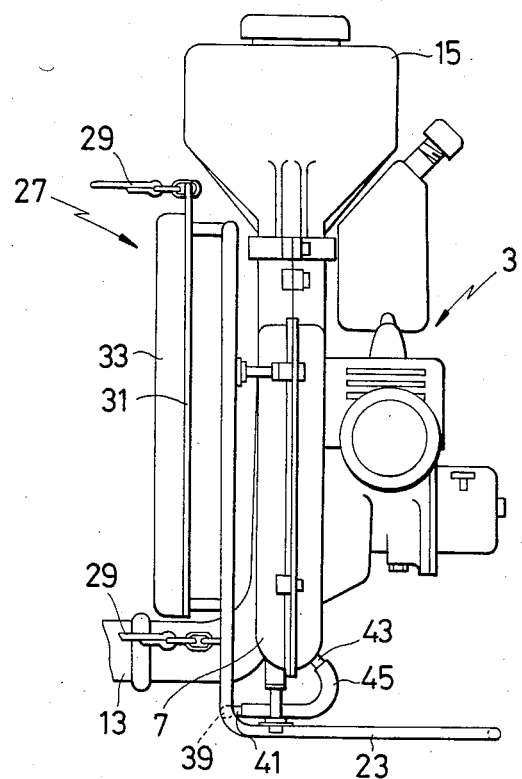
FIG. 6 is a side elevational view of another embodiment of the present invention.

Referring now to FIGS. 1 to 5, there is a chemicals spreader having a fan 1 connected to an engine 3 through a driving shaft 5 and covered by a fan case 7. Air is drawn from an air inlet 9 opening at the central portion of the front side of the fan case 7. The air is then introduced into a blower channel 11, guided through a blower tube 13 and exhausted from a nozzle (not shown) into the ambient.

Disposed above the fan 1 is a chemicals reservoir 15 from which chemicals are introduced through a shutter 17 into a chemicals feeding channel 19 and then mixed into the air stream flowing through the blower channel 11 and then spread out from the nozzle (not shown).

There is a lattice 21 affixed over the air inlet 9 to the fan case 7 by means of screws 22. The fan case 7 is connected through a buffer means 25 to and supported by a frame 23, to which a pack board 27 together with pack belts 29 is secured. The pack board 27 comprises a support plate 31 of synthetic resin affixed to the frame 23 in front of the opening of the air inlet port 9 and a sponge pad 33 adhered to the support plate 31 at the front surface thereof. The sponge pad 33 is formed with a plurality of parallel air grooves 35 on the front side thereof, and a plurality of air holes 37 extending through the bottom portion thereof and opening in the air grooves 35.

In operation, as the engine 3 is started, the fan 1 is rotated, air passes from the blower channel 11 through the blower tube 13 and exhausted from the nozzle (not shown) into the ambient air. The chemicals within the chemicals reservoir 15 is fed under the control of the shutter 17 through the chemicals feeding channel 19 into the air stream in the blower channel 11, and then spread out in a mixture from the nozzle (not shown). The operator carries the chemicals spreader with the pad 33 of the pack board 27 abutted on his back and the pack belts 29 hung on his shoulders, and then spreads the chemicals through the blower tube 13 in his hand, wherein the suction force of the air inlet port 9 causes air to flow through the air grooves 35 and enter the air inlet port 9 so that the air passes between the back of the operator and the pack board 27 to cool the back of the operator and accelerate the evaporation of sweat from the back of the operator.

Figure 7:
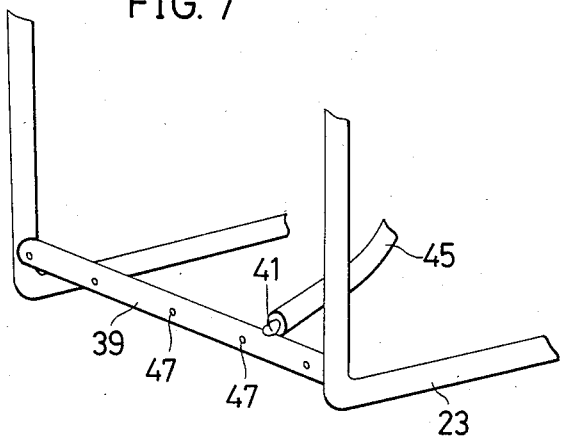
FIG. 7 is a perspective view of a frame portion of the embodiment of FIG. 6.

Another example of the present invention is illustrated in FIGS. 6 and 7, wherein like numerals designate previously described like elements. The chemicals spreader of the second example has a frame 23 having a horizontal frame 39 made from a pipe. The horizontal frame 39 is closed at the opposed ends thereof and has a tube joint 41 communicated with the interior of the horizontal frame 39. The tube joint 41 is also communicated with a plenum of the fan case 7 at a branching-off tube 43 through a hose 45. The horizontal frame 39 further has a plurality of delivery holes 47 opening toward a location below the pack board 27 in front of the horizontal frame 39. Part of the air stream from the fan 1 passes through the hose 45 and the horizontal frame 39 and exhausted from the delivery holes 47 onto the back of the operator whereby an air stream is introduced into spaces between the pad 33 and the back of the operator caused by trembling of the chemicals spreader, thereby cooling the back of the operator. Accordingly, the cooling effects will be improved in the second embodiment by providing the pad 33 with the air flow grooves 33 as shown in FIGS. 3 to 5.

While preferred embodiments of this invention have been shown and described, it will be appreciated that other embodiments will become apparent to those skilled in the art upon reading this disclosure, and, therefore, the invention is not to be limited by the disclosed embodiments.

What is claimed is:

1. A chemicals spreader to be carried on the back of an operator comprising:

a chemicals reservoir containing chemicals, a fan for blowing air, means for introducing said chemicals into the air stream caused by said fan to make a mixture thereof, means for spreading said mixture of said chemicals and said air, a pack board having a front side for abutting the back of the operator, means adjacent to said pack board for supporting said fan, and means provided in said pack board for passing and distributing part of the air stream caused by said fan onto the back of the operator.

2. A chemicals spreader to be carried on the back of an operator, comprising:

a fan for blowing air;

means for introducing said chemicals into the air stream caused by said fan to make a mixture thereof;

means for spreading said mixture of said chemicals and said air;

a pack board having a front side abutting the back of the operator;

frame means for supporting said fan and said pack board;

means provided in said pack board so as to pass part of the air stream caused by said fan onto the back of the operator;

a horizontal frame having a plurality of delivery holes for exhausting part of the air stream from said fan toward spaces between the back of the operator and the front side of said pack board; and communicating means employed between said fan and said horizontal frame for delivering air to said frame.

3. The spreader of claims 1 or 2 wherein said pack board comprises a support plate, a sponge adhered to the front surface of said support plate, said sponge and support plate having a plurality of corresponding openings for passing air therethrough from said fan to the back of the operator.

4. The spreader of claim 3 wherein said sponge is formed with a plurality of parallel air grooves.

5. The spreader of claim 3 further including frame means for receiving said support plate.

* * * * *

UNITED STATES PATENT AND TRADEMARK OFFICE
CERTIFICATE OF CORRECTION

PATENT NO. : 4,600,129
DATED : August 12, 1986
INVENTOR(S) : KEIJI KONDO

It is certified that error appears in the above-identified patent and that said Letters Patent is hereby corrected as shown below:

Column 3, line 12, after "operator" and before ".", insert --wherein said passing and distributing means comprises an air inlet provided adjacent to the rear side of the pack board to receive said part of the air stream through the front of the pack board and a plurality of holes communicating with said air inlet and extending through said pack board and a plurality of grooves provided on the front side of the pack board communicating with said plurality of holes so as to pass said part of the air stream to the rear side of the pack board--.

Signed and Sealed this

Seventh Day of October, 1986

[SEAL]

Attest:

DONALD J. QUIGG

Attesting Officer

Commissioner of Patents and Trademarks